US006101031A

United States Patent [19]
Yoshimura et al.

[11] Patent Number: 6,101,031
[45] Date of Patent: Aug. 8, 2000

[54] LENTICULAR LENS SHEET CAPABLE OF REDUCING COLOR SHIFT AND IMPROVING OVERALL LIGHT TEAM TRANSMITTANCE

[75] Inventors: Osamu Yoshimura; Hidehiro Tango, both of Niigata; Ichiro Matsuzaki, Tokyo, all of Japan

[73] Assignee: Kuraray Co., Ltd., Kurashiki, Japan

[21] Appl. No.: 09/065,728

[22] Filed: Apr. 24, 1998

[30] Foreign Application Priority Data

Apr. 25, 1997 [JP] Japan .................................. 9-108427

[51] Int. Cl.[7] .......................... G03B 21/60; G02B 27/10
[52] U.S. Cl. ................................. 359/456; 359/626
[58] Field of Search ........................... 359/460, 456, 359/455, 453, 451, 443, 619, 626

[56] References Cited

U.S. PATENT DOCUMENTS

| | | | |
|---|---|---|---|
| 3,893,748 | 7/1975 | De Palma et al. ................... | 350/128 |
| 4,190,320 | 2/1980 | Ferro ................................... | 350/129 |
| 4,509,823 | 4/1985 | Moriguchi et al. ................... | 350/128 |
| 4,859,027 | 8/1989 | Kishida ................................ | 350/128 |
| 5,262,101 | 11/1993 | Yagi et al. ........................... | 264/40.1 |
| 5,296,922 | 3/1994 | Mitani et al. ....................... | 348/779 |
| 5,457,572 | 10/1995 | Ishii et al. .......................... | 359/457 |
| 5,611,611 | 3/1997 | Ogino et al. ........................ | 353/74 |
| 5,661,600 | 8/1997 | Mitani et al. ....................... | 359/457 |
| 5,687,024 | 11/1997 | Yoshimura et al. ................. | 359/455 |

*Primary Examiner*—Safet Metjahic
*Assistant Examiner*—Christopher E Mahoney
*Attorney, Agent, or Firm*—Oblon, Spivak, McClelland, Maier & Neustadt, P.C.

[57] ABSTRACT

A lenticular lens sheet capable of reducing the color shift and improving the overall light beam transmittance. The lenticular lens sheet has an incident side lenticular lens on its light beam incident side surface and further has an emergent side lenticular lens on its emergent side surface, with peak portions of the emergent side lenticular lens being formed at substantially convergent positions of the incident side lenticular lens. When an inter-lens distance at the sheet central portion is taken to be $t_0$ and an inter-lens distance of an end portion of an viewable area of a rear-projection screen composed of this lenticular lens sheet is taken as $t_1$, the rate of the inter-lens distances $t_0$ and $t_1$ is determined to satisfy $0.98 \leq t_1/t_0 \leq 1.10$.

7 Claims, 5 Drawing Sheets

( CENTRAL PORTION )    ( END PORTION )

10A
RELATED ART ( CENTRAL PORTION )    ( END PORTION )

(CENTRAL PORTION)   (END PORTION)

10 A (CENTRAL PORTION)   (END PORTION)

10 B (CENTRAL PORTION)  (END PORTION)

LENTICULAR LENS SHEET CAPABLE OF REDUCING COLOR SHIFT AND IMPROVING OVERALL LIGHT TEAM TRANSMITTANCE

BACKGROUND OF THE INVENTION

1) Field of the Invention

The present invention relates to a lenticular lens sheet for use in a rear-projection screen.

2) Description of the Related Art

So far, as a technique of displaying large-screen pictures, there has been known a method in which an optical image is enlarged and projected from a CRT or a liquid crystal panel through a projection lens onto a rear-projection screen. FIG. 4 schematically shows a construction of a common rear-projection television for image formation based upon this method, FIG. 5 is an illustration available for explanation about light beams, and FIG. 6 is a perspective view showing a screen to be employed for the FIG. 4 rear-projection television.

In the rear-projection television shown in these illustrations, optical images emitted from CRTs 1 respectively corresponding to R (red), G (green) and B (blue) are enlarged through projection lenses 2 and, after being reflected on a reflecting mirror 7, formed as an image on a rear-projection screen 5 comprising a Fresnel lens sheet 3 and a lenticular lens sheet 4. In this case, the Fresnel lens sheet 3 fulfills a function to substantially direct the incident light toward the position of a viewer, while the lenticular lens sheet 4 has a function to disperse the light emerging from the Fresnel lens sheet 3, at given angles in the horizontal and vertical directions in an appropriate proportion of distribution to expand a visible angle to an angle of a given scope.

On the other hand, in such a display system, due to convergent angles $\epsilon$ of the light beams projected from the respective R, G and B CRTs 1, the images on the screen 5 vary in color tones when the screen viewing position changes in the horizontal directions (see FIG. 5). That is, in the common disposition of the CRTs 1, the green CRT 1 is at the central position whereas the red and blue CRTs 1 take the positions shifted therefrom in the left- and right-hand directions, and hence, if changing the viewing position in the left- and right-hand directions, the red and blue increase in color level. This phenomenon is referred to as a color shift.

For this reason, for the purpose of decreasing the color shift, as a lenticular lens sheet devised so far, there has been known a double-sided lenticular lens sheet generally designated at numeral 10 in FIG. 7 in which an incident side (entrance) lenticular lens 11 formed by arranging a plurality of cylindrical lenses in parallel is placed on a light-incident side surface, while an emergent side (exit) lenticular lenses 12 formed by arranging a plurality of cylindrical lenses in parallel is located on an emergent side surface, and further, light-absorbing layers 13 are formed on non-convergent portions of the incident side lenticular lens 11 existing on the emergent side surface.

Furthermore, as the current lenticular lens sheet manufacturing method, a thermoplastic resin extrusion forming method has been taken because of a high productivity and others. According to this method, for allowing smooth extrusion throughout the overall width of a die, the temperature of the end portions of the die is adjusted to be higher by 5 to 10° C. than that of the central portion thereof. This is for the purpose of compensating for the drop of the pressure at the end portions within a manifold by the decrease in viscosity.

However, since the thickness of the lenticular lens sheet is generally as thin as 0.5 mm to 1.5 mm, when a molten resin is put between shaping rolls in the prior extrusion forming method, the pressing working in the width directions of the shaping rolls becomes unequal so that the shaping rolls are largely distorted at their end portions with respect to their central portions, that is the so-called roll distortion takes place. For this reason, regardless of an intention of forming a double-sided lenticular lens sheet with a uniform thickness in the width directions, in fact, as shown in FIG. 8, an inter-lens distance $t_1$ of the end portion of the double-sided lenticular lens sheet 10 (in more detail, the inter-lens distance $t_1$ at an end portion of an viewable area of a rear-projection screen using a lenticular lens sheet) becomes thinner by a value exceeding several % than the thickness to at the central portion. In addition, due to the unexpected reduction of the inter-lens distance at the end portion, as shown in the same illustration, an incidence angle $\theta_1$ of a light beam L incident on the emergent side lenticular lens 12 at the end portion of the double-sided lenticular lens sheet 10 becomes extremely larger than an incidence angle $\theta_0$ of the light beam L incident on the emergent side lenticular lens 12 at the central portion of the double-sided lenticular lens sheet 10, which causes the overall light beam transmittance to go down.

Furthermore, in the case that, in the central portion of the double-sided lenticular lens sheet 10, the sheet thickness is set so that the light incident on the incident side lenticular lens 11 is condensed on the emergent side lenticular lens 12 surface and the light-absorbing layers 13 are provided on the non-convergent portions of the incident side lenticular leans 11 on the emergent side lenticular lens 12 surface, if the incidence angle $\theta_1$ of the light beam L incident on the emergent side lenticular lens 12 at the end portion of the double-sided lenticular lens sheet 10 increases as mentioned above, a problem arises in that the exit of the light beam L from the emergent side lenticular lens 12 is blocked by the light-absorbing layers 13, that is, the so-called light eclipse occurs. Moreover, since the difference between the incidence angle $\theta_{1R}$ made when the light beam from the red CRT is incident on the emergent side lenticular lens 12 and the incidence angle $\theta_{1B}$ made when the light beam from the blue CRT is incident on the emergent side lenticular lens 12 becomes large, a large color shift takes place.

Incidentally, these problems originating from the reduction of the inter-lens distance do not take place in the case of a single-sided lenticular lens sheet 10x shown in FIG. 9 (that is, a lenticular lens sheet in which an incident side lenticular lens 11 is provided on an incident side surface for the light beam L and a flat emergent surface is formed at a portion from which the light incident on the incident side lenticular lens 11 exits). In the single-sided lenticular lens sheet 10x, the lenticular lens sheet thickness equivalent to the aforesaid inter-lens distance of the double-sided lenticular lens sheet 10 decreases from $t_0$ to $t_1$, and even if the light beam L emergent side surface changes from the emergent side surface $S_0$ at the original position to the emergent side surface $S_1$ at the position indicated by a dotted line, the relationship between the incidence angle $\theta_0$ made with respect to the emergent side surface $S_0$ when taking the original sheet thickness and the incidence angle $\theta_1$ made with respect to the emergent side surface $S_1$ after the reduction of the sheet thickness is $\theta_0=\theta_1$, that is, no change takes place. Accordingly, the transmittance of the light beam L does not vary in the emergent side surfaces $S_0, S_1$. Further, although the color shift in the single-sided lenticular lens sheet becomes originally larger as compared with the double-sided lenticular lens sheet, the degree of the color shift does not vary due to the reduction of the sheet thickness.

SUMMARY OF THE INVENTION

The present invention has been developed with a view to eliminating the above-mentioned problems inherent to the prior technique, and it is therefore an object of this invention to provide a double-sided lenticular lens sheet capable of reducing the color shift with respect to a single-sided lenticular lens sheet, and further capable of enhancing the overall light beam transmittance of the sheet and further of improving the light use efficiency by preventing the light eclipse by the light-absorbing layer formed on the sheet emergent side surface.

For this purpose, in accordance with the present invention, in a double-sided lenticular lens sheet which has an incident side lenticular lens on a light beam incident side surface and further has an emergent side lenticular lens on an emergent side surface and in which peak portions of the emergent side lenticular lens are formed at substantially convergent positions of the incident side lenticular lens, in terms of inter-lens distances being distances between peak portions of the incident side lenticular lens and the peak portions of the emergent side lenticular lens, when an inter-lens distance of a central portion of an viewable area of a rear-projection screen composed of this lenticular lens sheet is taken to be $t_0$ while an inter-lens distance of an end portion of the viewable area is taken as $t_1$, the following relationship is satisfied.

$$0.98 \leq t_1/t_0 \leq 1.10.$$

According to this invention, since the inter-lens distance of the actual lenticular lens sheet after the extrusion forming is set to be equal to or above 0.98 at the end portion of the screen viewable area relative to the central portion, the incidence angle $\theta_1$ made when the light incident on the incident side lenticular lens at the end portion of the lenticular lens sheet is incident on the emergent side lenticular lens does not become excessively large, so that the overall light beam transmittance can improve, the light eclipse is preventable and the color shift is reducible.

In addition, since the upper limit of the inter-lens distance at the screen viewable area end portion assumes 1.10 with respect to the central portion inter-lens distance, the lenticular lens sheet can has a sufficient horizontal diffusion property. Accordingly, the cut-off phenomenon coming from the reduction of the horizontal diffusion is avoidable.

Furthermore, in this invention, in terms of the lens depth of the incident side lenticular lens, if the lens depth $h_{i1}$ of the end portion of the viewable area of the rear-projection screen composed of this lenticular lens sheet is equal to or above 0.98 as compared with the lens depth $h_{i0}$ of the central portion thereof, since the incidence angle $\theta_1$ made when the light incident on the incident side lenticular lens at the end portion of the lenticular lens sheet is incident on the emergent lenticular lens is more certainly preventable from becoming excessively large, the incidence angle $\theta_1$ at the end portion thereof becomes equal to the incidence angle $\theta_0$. Accordingly, it is possible to further prevent the light eclipse, reduce the color shift and improve the overall light beam transmittance. In addition, if the end portion lens depth $h_{i1}$ relative to the central portion lens depth $hi_0$ is set to 1.10, it is possible to further prevent the cut-off phenomenon originating from the reduction of the horizontal diffusion.

In this case, the lens depth of the cylindrical lens constituting the incident side lenticular lens signifies the height from a lens dent portion being a boundary line between the adjacent ones of the plurality of cylindrical lens organizing the incident side lenticular lens to the lens peak portion being the portion on the cylindrical lens surface most protruding toward the light source side. Thus, in the case that the respective cylindrical lenses have a true-circle cross section and have the same pitch, the lens depth increases as the radius of curvature decreases.

Besides, these effects are also attainable in the rear-projection screen other than that in which the lenticular lens sheet according to this invention, together with the three CRTs, is used for projecting a color optical image. The rear-projection screen using the lenticular lens sheet according to this invention and LCDs or DMDs instead of CRTs as a light source, also can improve the overall light beam transmittance and further can enhance the horizontal diffusion property to prevent the cut-off phenomenon.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

The present invention will be described hereinbelow with reference to the drawings.

Figure 1:
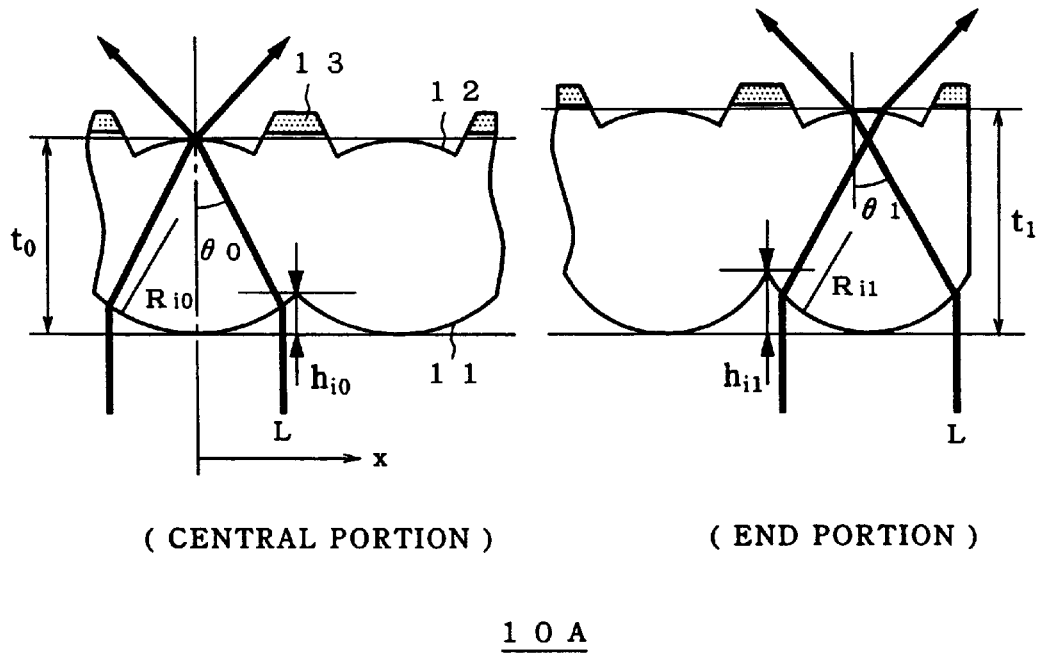
FIG. 1 is a cross-sectional view showing a lenticular lens sheet according to the present invention, and is a light beam tracking illustration.

FIG. 1 is a width-direction cross-sectional view showing a lenticular lens sheet 10A according to an embodiment of this invention. As shown in this illustration, this lenticular lens sheet, generally designated at 10A, is a double-sided lenticular lens sheet which has an incident side lenticular lens 11 on an incident side surface for a light beam L and an emergent side lenticular lens 12 on an emergent side surface for the light beam L, with light-absorbing layers 13 being provided on non-convergent portions of the incident side lenticular lens 11 on the light beam L emergent side surface.

Each of the incident side lenticular lens 11 and the emergent side lenticular lens 12 has a configuration shaped by arranging cylindrical lenses in parallel in the sheet width directions. Further, each of the peak portions of the emergent side lenticular lens 12 is formed at a substantially convergent position of each of the incident side lenticular lens 11.

The radius of curvature of each of the cylindrical lenses organizing the incident side lenticular lens 11 becomes monotonously smaller in accordance with the increase in the distance x from the sheet central portion in the width direction (that is, in the direction perpendicular to the longitudinal direction of the cylindrical lens), and the radius $R_{i1}$ of curvature of the cylindrical lens of the incident side lenticular lens 11 at the viewable area end portion of the rear-projection screen composed of the lenticular lens sheet 10A is smaller by approximately several % than the radius $R_{i0}$ of the sheet central portion. With this, the lens depth $h_{i1}$ at the end portion of the incident side lenticular lens 11 is larger as compared with the lens depth $h_{i0}$ of the central portion.

Furthermore, within the viewable area of the rear-projection screen using the lenticular lens sheet 10A, the rate $t(x)/t_0$ of the inter-lens distance $t(x)$ of the width-direction distance x from the viewable area central portion to the inter-lens distance $t_0$ in the viewable area central portion monotonously increases in accordance with the increase in x, and when the inter-lens distance at the viewable area end portion of the rear-projection screen based upon the lenticular lens sheet 10A is taken to be $t_1$, the following relationship is satisfied.

$$0.98 \leq t_1/t_0 \leq 1.10$$

Although FIG. 1 illustrates the case that the inter-lens distance rate $t(x)/t_0$ increases monotonously, this embodiment similarly includes the case that the inter-lens distance rate $t(x)/t_0$ decreases monotonously.

FIG. 1 shows both the transmission states of the light beam L in the central and end portions of the lenticular lens sheet 10A. In this lenticular lens sheet 10A, since the inter-lens distance $t_1$ in the screen viewable area end portion is 0.98 or more with respect to the inter-lens distance $t_0$ in the central portion thereof, the incidence angle $\theta_1$ of the light beam L incident on the emergent side lenticular lens 12 at the screen viewable area end portion does not become extremely larger than the incidence angle $\theta_0$ to the emergent side lenticular lens 12 at the central portion, but coincides with the incidence angle $\theta_0$ at the central portion. In addition, since the peak portion of the emergent side lenticular lens 12 is formed at the substantially convergent position of the incident side lenticular lens 11, the light eclipse does not take place due to light-absorbing layer 13. Accordingly, this lenticular lens sheet 10A can improve the overall light beam transmittance and can reduce the color shift.

Still further, in this lenticular lens sheet 10A, since the inter-lens distance $t_1$ at the screen viewable area end portion is equal to or below 1.10 with respect to the inter-lens distance $t_0$ at the viewable area central portion, the horizontal diffusion property is securable, with the result that the cut-off phenomenon is not occur.

As a method of manufacturing the FIG. 1 lenticular lens sheet 10A, for instance, there is the so-called press method in which two flat metal molds having a pattern opposite to the product are prepared and a heated resin is pressurized and cooled in a state of being placed in between the two metal molds or a extrusion forming method in which a molten resin from a die is poured into a set of shaping rolls having a configuration opposite to the product and further pressed and cooled.

Particularly, since the extrusion forming method can gradually change the lens depth, the sheet thickness, or the like in the width direction, it is useful as the manufacturing method for the lenticular lens sheet according to this invention.

In this instance, if, for the manufacturing the lenticular lens sheet, the press method or the extrusion forming method is conducted according to the previous example, in the lenticular lens sheet obtained, the thickness of the end portion becomes thinner by approximately several % as compared with that of the central portion, and hence, a thickness control operation is conducted so that the thickness of the end portion increases with respect to the thickness of the central portion at the extrusion forming. In more detail, for instance, in the case of the formation according to the extrusion forming method, the resin bank existing between the shaping rolls and the resin is increased at the end portion of the lenticular lens sheet with respect to the central portion thereof. Further, in the case of the extrusion forming method, it is also appropriate that at least one of the set of shaping rolls is constructed as a crowning roll. In this case, although depending upon the banks at the central and end portions, if not varying them, it is desirable that the roll crowning quantity is above 20 μm per 1 m.

Figure 2:
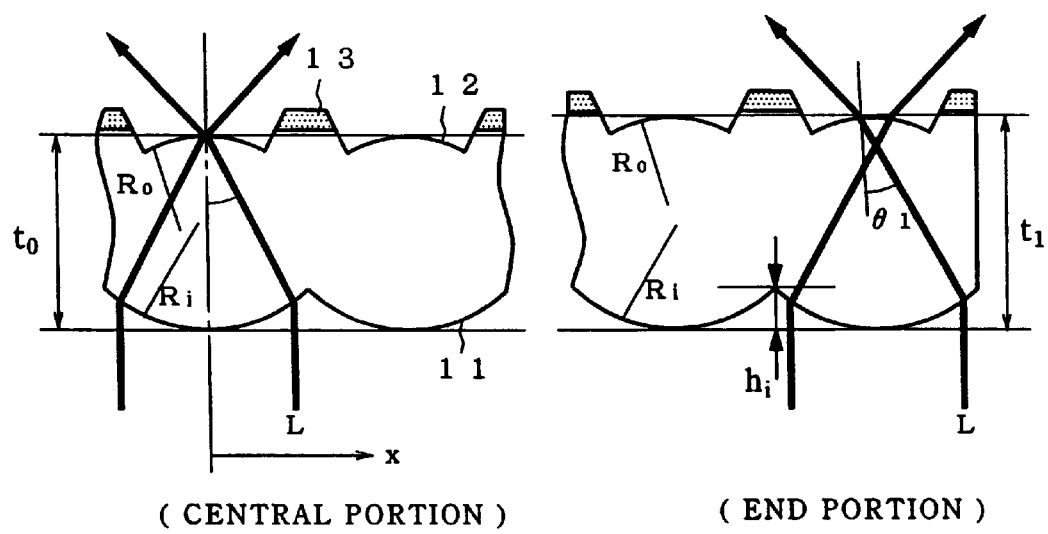
FIG. 2 is a cross-sectional view showing a modification of a lenticular lens sheet according to the present invention, and is a light beam tracking illustration.

FIG. 2 is a width-direction cross-sectional view showing a lenticular lens sheet 10B according to another embodiment of this invention. As shown in this illustration, as well as the FIG. 1 lenticular lens sheet 10A, this lenticular lens sheet 10B is a double-sided lenticular lens sheet in which light-absorbing layers 13 are provided on the emergent side surface for the light beam L, the inter-lens distance $t(x)$ of the width-direction distance from the sheet central portion being taken as x monotonously increases with respect to the inter-lens distance $t_0$ at the sheet central portion, and the inter-lens distance $t_1$ at the viewable area end portion of the rear-projection screen is set to 0.98 to 1.10 times with respect to the inter-lens distance $t_0$ at the sheet central portion. However, in this lenticular lens sheet 10B, the radius $R_i$ of curvature of the cylindrical lenses constituting the incident side lenticular lens 11 is the same throughout the entire width of the sheet, and therefore, the lens depth $h_i$ is also the same throughout the entire width of the sheet. Further, the radius $R_o$ of curvature of the cylindrical lenses organizing the emergent side lenticular lens 12 is the same over the entire width of the sheet.

Incidentally, although FIG. 2 shows the case of monotonously increasing the rate $t(x)/t_0$ of the inter-lens distance $t(x)$ at the position where the distance from the viewable area central portion of the rear-projection screen composed of this lenticular lens sheet 10B is taken as x to the inter-lens distance $t_0$ at the viewable area central portion, this embodiment similarly includes the case of monotonously decreasing this rate $t(x)/t_0$.

FIG. 2 illustrates both the light transmission states in the central and end portions of the lenticular lens sheet 10B. As in the case of the above described FIG. 1 lenticular lens sheet 10A, in this lenticular lens sheet 10B, the incidence angle $\theta_1$ of the light beam L incident on the emergent side lenticular lens 12 at the end portion of the lenticular lens sheet 10B does not extremely increase with respect to the incidence angle $\theta_0$ of light beam incident on the emergent side lenticular lens 12 at the central portion, but coincides with the incidence angle $\theta_0$ at the central portion. In addition, since the peak portion of the emergent side lenticular lens 12 is formed at the substantially convergent position of the incident side lenticular lens 11, the light eclipse does not occur due to the light-absorbing layer 13. Accordingly, the lenticular lens sheet 10B can improve the overall light beam transmittance and reduce the color shift as compared with the prior lenticular lens sheet.

Now, comparing the FIG. 2 lenticular lens sheet 10B with the FIG. 1 lenticular lens sheet 10A, with respect to the FIG. 1 lenticular lens sheet 10A, the FIG. 2 lenticular lens sheet 10B has a smaller light beam incidence angle 01 to the emergent side lenticular lens 12 at the sheet end portion. For this reason, the overall light beam transmittance becomes higher than that of the FIG. 1 lenticular lens sheet 10A. On the other hand, the horizontal diffusion angle becomes smaller than that of the FIG. 1 lenticular lens sheet 10A.

In a method of manufacturing the FIG. 2 lenticular lens sheet 10B, as well as the manufacturing method for the FIG. 1 lenticular lens sheet 10A, when conducting the formation based upon the press method, the extrusion forming method, or the like, the bank adjustment, the adjustment of the crowning quantity of the shaping rolls, or the like is done so that the thickness of the end portion becomes equal to or larger than the thickness of the central portion. In addition, in the case of the extrusion forming method, it is preferable that the temperature of the die for the extrusion is set to be uniform at the central portion and at the end portion, or the temperature of the central portion is set to be higher by 5 to 10° C. than that of the end portion, to increase the bank at the roll end portion. If controlling the temperature of the die in this way, since the resin whose temperature is relatively low is extruded from the die end portion, there is a possibility that a portion unacceptable as a sheet edge portion is formed. In this case, that portion may be removed.

In addition to the above-described lenticular lens sheets 10A and 10B, this invention can take various arrangements as long as the rate $t_1/t_0$ of the inter-lens distance $t_1$ in the viewable area end portion of the rear-projection screen to the inter-lens distance $t_0$ in the sheet central portion is between 0.98 and 1.10. For instance, in the case of the above-mentioned example, when the distance from the sheet central portion is x, the inter-lens distance t(x) is made to monotonously increase or decrease in accordance with the increase in x, and on the contrary, it is also possible to vary the inter-lens distance t(x) stepwise. Further, it is also appropriate that the inter-lens distances are set to be equal to each other throughout the range from the sheet central portion to the sheet circumfernetial portion.

Moreover, in terms of the lens configurations of the incident side lenticular lens 11 and the emergent side lenticular lens 12, in the case of each of the above-mentioned lenticular lens sheets 10A and 10B, the outer shapes of the cylindrical lenses constituting the incident side or emergent side lenticular lens have arc configurations each of which is expressed with a radius of curvature. However, the out shape of the lens is not limited to the arc configuration, but can take an elliptical arc configuration. And, a configuration expressed by the following equation is also acceptable.

$$Y(X)=Cx^2/[1+\{1-(K+1)C^2 X^2\}^{1/2}]+Dx^4+Ex^6+Fx^8+Gx^{10}$$

where x represents a distance from the lens center in a pitch direction, C designates the inverse number of a radius of curvature, K denotes a cone constant, and D, E, F and G depict coefficients of the terms of fourth to tenth orders, respectively.

Furthermore, in the case of the foregoing examples, although the radius $R_i$ of curvature of the cylindrical lenses constituting the incident side lenticular lens 11 is made smaller by approximately several % in the sheet end portion than in the sheet central portion and, in connection with this, the lens depth $h_i$ of the incident side lenticular lens is made larger in the sheet end portion than in the sheet central portion (see FIG. 1) or the radius $R_i$ of curvature and the lens depth $h_i$ are the same throughout the entire sheet width (see FIG. 2), in this invention, the distribution state of the radius $R_i$ of curvature of the cylindrical lenses constituting the incident side lenticular lens and the distribution state of the lens depth $h_i$ are not limited to these. Preferably, when the lens depth of the incident side lenticular lens in the viewable area central portion of the rear-projection screen composed of this lenticular lens sheet is taken to be $h_{i0}$ and the lens depth of the incident side lenticular lens in the viewable area end portion thereof is taken as $h_{i1}$, the condition of $0.98 \leq h_{i1}/h_{i0} \leq 1.10$ is satisfied. Whereupon, the color shift is further reducible and the overall light beam transmittance is improvable. Besides, in this case, the lens depth rate $h_{i1}/h_{i0}$ can be made to monotonously increase or decrease from the screen central portion to the screen end portion.

Figure 6:
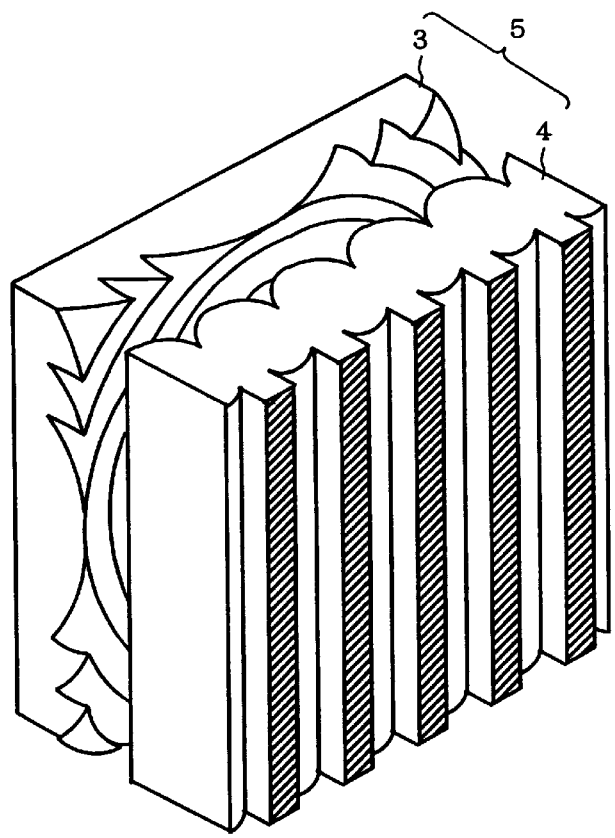
FIG. 6 is a perspective view showing a screen to be employed for the rear-projection television.
Figure 7:
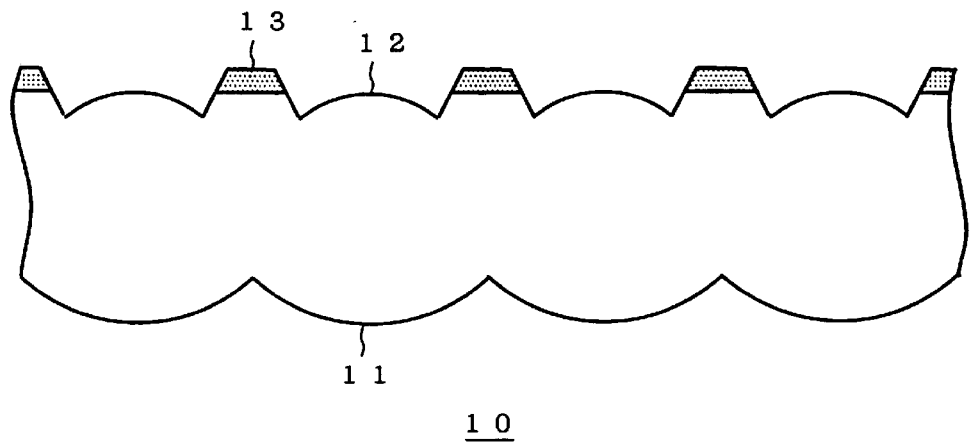
FIG. 7 is a cross-sectional view showing a prior double-sided lenticular lens sheet.
Figure 8:
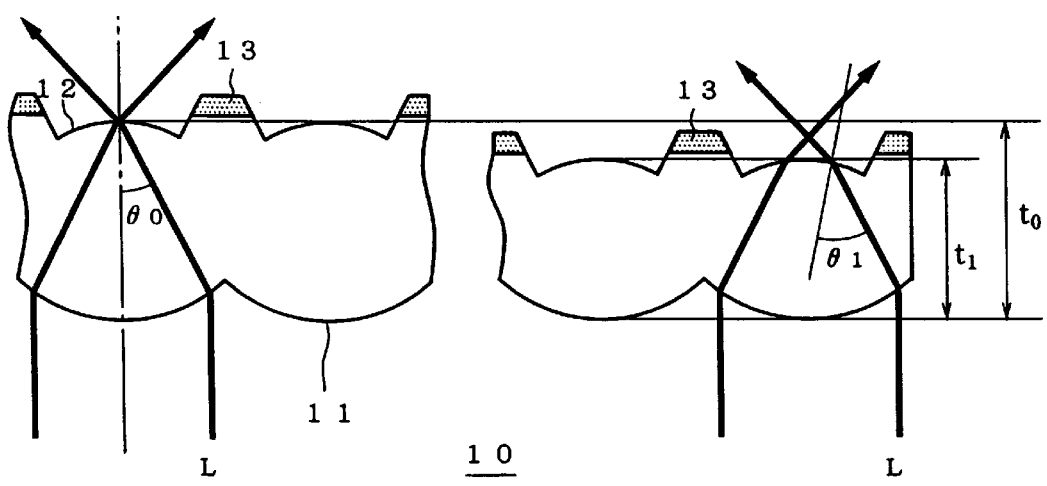
FIG. 8 is a light beam tracking illustration of the prior double-sided lenticular lens sheet.
Figure 9:
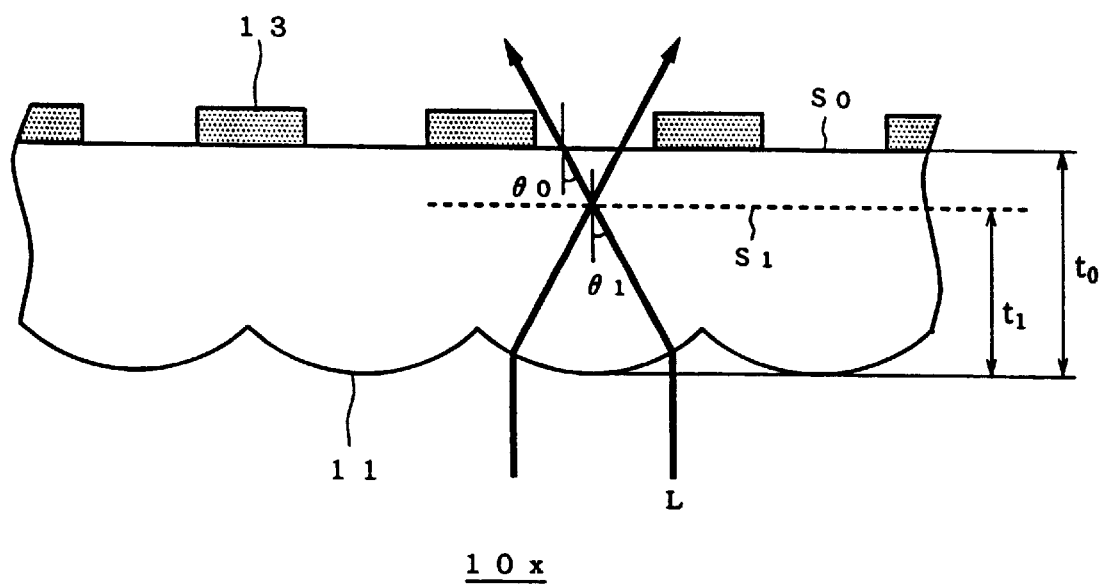
FIG. 9 is a cross-sectional view showing a prior single-sided lenticular lens sheet, and is a light beam tracking illustration.

As shown in FIG. 6, as well as the prior lenticular lens sheet, the lenticular lens sheet according to this invention is applicable to a rear-projection screen in a manner of being used together with a Fresnel lens sheet. In this case, it is possible to employ a Fresnel lens sheet which has been used for the prior rear-projection screen.

Still further, when LCDs or DMDs other than CRTs are used as light sources, the rear-projection screen using the lenticular lens sheet according to this invention is preferable because of enhancing the overall light beam transmittance.

The present invention will be described hereinbelow in more detail with reference to examples.

EXAMPLE 1

(1) Manufacturing of a Lenticular Lens Sheet

A lenticular lens sheet having a structure shown in FIG. 2 was manufactured according to the extrusion forming method using crowning rolls. In this case, a polymethyl methacrylate was used as a resin for making the lenticular lens sheet. In addition, in the extrusion forming condition, the die temperature was increased by 5° C. in the die central portion with respect to the die end portion, while the bank was increased by approximately 10% at the roll end portion with respect to the roll central portion.

Thus, formed was a lenticular lens sheet of: a sheet longitudinal length=1500 mm; an transversal length=1000 mm; a pitch (p) of the incident side lenticular lens 11=0.78 mm; an approximate radius $R_{i0}$ of an elliptical arc at a sheet central portion of the incident side lenticular lens 11=0.320 mm; a lens depth $h_{i0}$ at a sheet central portion of the incident side lenticular lens 11=0.300 mm; an approximate radius $R_{i1}$ of an elliptical arc at a sheet end portion of the incident side lenticular lens 11=0.320 mm; a lens depth $h_{i1}$ at a sheet end portion of the incident side lenticular lens 11=0.300 mm, a pitch (p) of the emergent side lenticular lens 12=0.36 mm; an approximate radius $R_{o0}$ of an elliptical arc at a sheet central portion of the emergent side lenticular lens 12=0.22 mm; an approximate radius $R_{o1}$ of an elliptical arc at a sheet end portion of the emergent side lenticular lens 12=0.22 mm; an inter-lens distance $t_0$ in a central portion of the lenticular lens sheet=0.930 mm; and an inter-lens distance $t_1$ in an end portion thereof=0.930 mm.

Subsequently, light-absorbing layers 13 were printed on the formed lenticular lens sheet in a common way (stripe width=0.32 mm), thereby providing the lenticular lens sheet according to the embodiment.

(2) Evaluation (2-1) Color Shift

Figure 3:
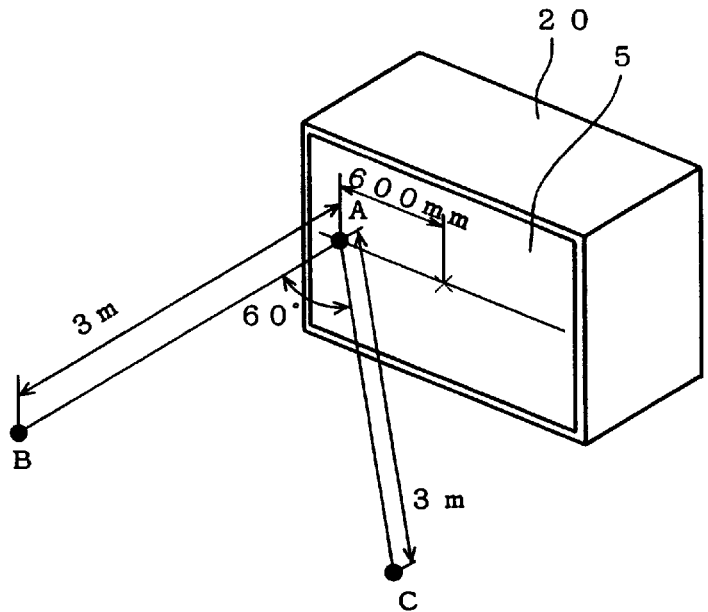
FIG. 3 is an illustration for explaining a method of measuring a color shift.
Figure 4:
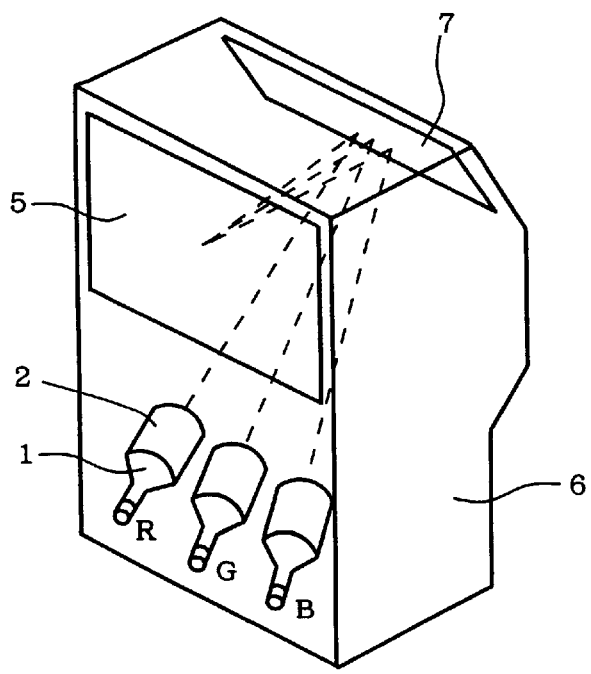
FIG. 4 is a schematic illustration of a construction of a common rear-projection television.
Figure 5:
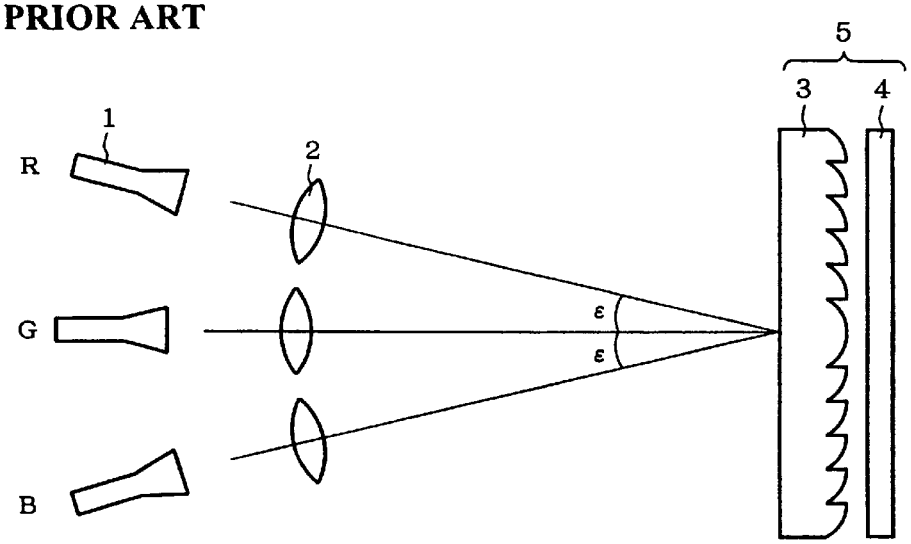
FIG. 5 is an illustration available for describing light beams in the common rear-projection television.

A Fresnel lens sheet of a focal length f=900 mm was prepared and a rear-projection screen (whose width was approximately 1250 mm and height was approximately 950 mm) was produced by a combination with the above-mentioned lenticular lens sheet. This screen was set to a rear-projection type projector television (manufactured by TOSHIBA AMERICA CONSUMER PRODUCTS., INC; Model Name TP61E90). Further, a white raster signal was inputted to this television set, and as shown in FIG. 3, the position (A) separated by 600 mm from the center of a screen 5 of the television set 20 in the horizontal direction on the left-hand side was observed from the position (B) separated by 3 m in front of the screen 5 and the position (C) shifted therefrom by 60° counterclockwise in the horizontal direction, thus obtaining the following evaluation about the color shift.

First, an emergent luminance ($R_0$[nit]) from the screen 5 was measured at the position (B) in a state where blue and green light sources were covered with covers while a red color light was emitted onto the screen 5. Subsequently, an emergent luminance ($B_0$[nit]) of a blue color light from the screen 5 was similarly measured in a state where red and green light sources were covered with covers.

Furthermore, after the measuring position was shifted to the position (C), as well as the measurement at the position (B), the measurement was done for a red light emergent luminance $R_{60}$[nit] and a blue light emergent luminance $B_{60}$[nit].

Still further, in accordance with the following equation, obtained was a color shift $CS_{(600\ mm,\ 60\ degrees)}$ representative of the magnitude of the color variation at the position (A) separated by 600 mm from the center of the screen 5 in the left-hand direction.

$$CS_{(600\ mm,\ 60\ degrees)} = 20\log((R_{60}/R_0)/(B_{60}/B_0))[dB]$$

The results are shown in a Table 1.

(2-2) Overall Light Beam Transmittance

As in the case of the above-mentioned color shift measurement, the lenticular lens sheet is mounted on the rear-projection projector television, and in terms of the position separated by 600 mm from the center of the screen of this television set in the horizontal direction on the left-hand side, the overall light beam transmittance $T_t$ was measure according to ASTM D-1003. The results are shown in the Table 1.

EXAMPLES 2 TO 8 AND COMPARATIVE EXAMPLES 1 TO 3

In a substantially similar way to the aforesaid examples, manufactured were lenticular lens sheets having configurations shown in the table 1 and the following Table 2. The color shift and the overall light beam transmittance were measured using the lenticular lens sheets. The results are shown in the Tables 1 and 2.

TABLE 1

| | Examples | | | | | | | |
|---|---|---|---|---|---|---|---|---|
| | 1 | 2 | 3 | 4 | 5 | 6 | 7 | 8 |
| Sheet Central Portion | | | | | | | | |
| Inter-Lens Distance $t_0$ (mm) | 0.930 | ← | ← | ← | ← | ← | ← | ← |
| Incident Lens $R_{i0}$ (mm) | 0.320 | ← | ← | ← | ← | ← | ← | ← |
| Incident Lens $h_{i0}$ (mm) | 0.300 | ← | ← | ← | ← | ← | ← | ← |
| Emergent Lens $R_{o0}$ (mm) | 0.220 | ← | ← | ← | ← | ← | ← | ← |
| Sheet End Portion | | | | | | | | |
| Inter-Lens Distance $t_1$ (mm) | 0.930 | 0.925 | 0.940 | 0.960 | 0.925 | 0.960 | 0.930 | 0.930 |
| Incident Lens $R_{i1}$ (mm) | 0.320 | ← | ← | ← | 0.31 | 0.31 | 0.324 | 0.290 |
| Incident Lens $h_{i1}$ (mm) | 0.300 | 0.300 | 0.300 | 0.300 | 0.310 | 0.310 | 0.295 | 0.330 |
| Emergent Lens $R_{o1}$ (mm) | 0.220 | ← | ← | ← | ← | ← | ← | ← |
| Lens Depth Rate ($h_{i1}/h_{i0}$) | 1.00 | ← | ← | ← | 1.03 | 1.03 | 0.983 | 1.10 |
| Color Shift (dB) | 7.5 | 8.0 | 7.5 | 7.0 | 8.0 | 7.0 | 8.0 | 6.0 |
| Overall Transmittance $T_t$ (%) | 83 | 82 | 84 | 86 | 81 | 85 | 83 | 87 |

TABLE 2

| | Comparative Examples | | |
|---|---|---|---|
| | 1 | 2 | 3 |
| Sheet Central Portion | | | |
| Inter-Lens Distance $t_0$ (mm) | 0.930 | ← | ← |
| Incident Lens $R_{i0}$ (mm) | 0.32 | ← | ← |
| Incident Lens $h_{i0}$ (mm) | 0.300 | ← | ← |
| Emergent Lens $R_{o0}$ (mm) | 0.220 | ← | ← |
| Sheet End Portion | | | |
| Inter-Lens Distance $t_1$ (mm) | 0.910 | 0.870 | 1.025 |
| Incident Lens $R_{i1}$ (mm) | 0.32 | 0.30 | 0.32 |
| Incident Lens $h_{i1}$ (mm) | 0.300 | 0.320 | 0.300 |
| Emergent Lens $R_{o1}$ (mm) | 0.22 | ← | ← |
| Lens Depth Rate ($h_{i1}/h_{i0}$) | 1.00 | 1.07 | 1.00 |
| Color Shift (dB) | 8.5 | 10.0 | 5.5 |
| Overall Transmittance $T_t$ (%) | 81 | 77 | 89 |
| | | | (Occurrence of Cut-off) |

As obvious from the Tables 1 and 2, in the case of the lenticular lens sheet according to the embodiment in which the inter-lens distance at the sheet end portion is within a range of 0.98 to 1.10 with respect to that of the sheet central portion, it is possible to reduce the color shift and to improve the overall light beam transmittance. In addition, the light eclipse is preventable to improve the light use efficiency.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A double-sided lenticular lens sheet having an incident side lenticular lens on its light beam incident side surface and further having an emergent side lenticular lens on its emergent side surface, with peak portions of said emergent side lenticular lens being formed at substantially convergent positions of said incident side lenticular lens, wherein, in terms of inter-lens distances being distances between peak portions of said incident side lenticular lens and said peak portions of said emergent side lenticular lens, when said inter-lens distance of a central portion of a viewable area of a rear-projection screen composed of said lenticular lens sheet is taken to be $t_0$ and said inter-lens distance of an end portion of said viewable area thereof is taken as $t_1$, the rate of said inter-lens distances $t_0$ to $t_1$, is determined to satisfy the following condition:

$$0.98 \leq t_1/t_0 \leq 1.10$$

wherein $t_1$ does not equal $t_0$.

2. A double-sided lenticular lens sheet as defined in claim 1, wherein, when said inter-lens distance at a position separated by a distance x from said screen viewable area central portion in a direction perpendicular to a longitudinal direction of a cylindrical lens constituting said incident side lenticular lens is taken to be $t(x)$, within said screen viewable area, $t(x)/t_0$ monotonously increases in accordance with the increase in said distance x.

3. A double-sided lenticular lens sheet as defined in claim 1, wherein, when said inter-lens distance at a position separated by a distance x from said screen viewable area central portion in a direction perpendicular to a longitudinal direction of a cylindrical lens constituting said incident side lenticular lens is taken to be $t(x)$, within said screen viewable area, $t(x)/t_0$ monotonously decreases in accordance with the increase in said distance x.

4. A double-sided lenticular lens sheet as defined in claim 1, wherein, when a lens depth of said incident side lenticular lens in said screen viewable area central portion is taken to be $h_{i0}$ and a lens depth of said incident side lenticular lens in said screen viewable area end portion is taken to be $h_{i1}$, the rate of said lens depths $h_{i0}$ and $h_{i1}$ is determined to satisfy the following condition:

$$0.98 \leq h_{i1}/h_{i0} \leq 1.10.$$

5. A double-sided lenticular lens sheet as defined in claim 4, wherein, when a lens depth of said incident side lenticular lens at a position separated by a distance x from said screen viewable area central portion in a direction perpendicular to a longitudinal direction of a cylindrical lens constituting said incident side lenticular lens is taken to be $h_{ix}$, within said screen viewable area, $h_{ix}/h_{i0}$ monotonously increases in accordance with the increase in said distance x.

6. A double-sided lenticular lens sheet as defined in claim 4, wherein, when a lens depth of said incident side lenticular lens at a position separated by a distance x from said screen viewable area central portion in a direction perpendicular to a longitudinal direction of a cylindrical lens constituting said incident side lenticular lens is taken to be $h_{ix}$, within said screen viewable area, $h_{ix}/h_{i0}$ monotonously decreases in accordance with the increase in said distance x.

7. A double-sided lenticular lens sheet as defined in claim 1, wherein said lenticular lens sheet is formed by an extrusion forming method.

* * * * *